(12) United States Patent
Alonzo et al.

(10) Patent No.: US 8,369,072 B1
(45) Date of Patent: Feb. 5, 2013

(54) SCREEN PROTECTOR APPLICATOR

(76) Inventors: Reynaldo V. Alonzo, Fresno, CA (US); Nina Seyedabadi, Fresno, CA (US)

( * ) Notice: Subject to any disclaimer, the term of this patent is extended or adjusted under 35 U.S.C. 154(b) by 212 days.

(21) Appl. No.: 12/869,824

(22) Filed: Aug. 27, 2010

Related U.S. Application Data

(60) Provisional application No. 61/357,777, filed on Jun. 23, 2010.

(51) Int. Cl.
*G06F 1/16* (2006.01)
(52) U.S. Cl. .................................. 361/679.01
(58) Field of Classification Search ............... 361/679.01
See application file for complete search history.

(56) References Cited

U.S. PATENT DOCUMENTS

| | | | | |
|---|---|---|---|---|
| 4,762,227 A * | 8/1988 | Patterson | ...................... | 206/320 |
| 5,499,713 A * | 3/1996 | Huffer | ........................... | 206/320 |
| 6,082,535 A * | 7/2000 | Mitchell | ........................ | 206/320 |
| 6,125,525 A * | 10/2000 | Brock | ......................... | 29/525.01 |
| 6,659,274 B2 * | 12/2003 | Enners | ........................... | 206/305 |
| 6,717,627 B2 * | 4/2004 | Senkler | ........................... | 348/823 |
| 6,750,922 B1 | 6/2004 | Benning | | |
| 6,975,888 B2 * | 12/2005 | Buesseler et al. | .......... | 455/575.1 |
| 7,070,837 B2 | 7/2006 | Ross | | |
| 7,133,707 B1 | 11/2006 | Rak et al. | | |
| 7,226,176 B1 * | 6/2007 | Huang | ........................ | 359/609 |
| 7,312,984 B2 * | 12/2007 | Richardson et al. | ...... | 361/679.41 |
| 7,428,427 B2 | 9/2008 | Brunstrom et al. | | |
| 8,068,331 B2 * | 11/2011 | Sauers et al. | ............. | 361/679.01 |
| 2004/0246386 A1 * | 12/2004 | Thomas et al. | ............... | 348/818 |
| 2007/0021068 A1 * | 1/2007 | Dewhurst | ........................ | 455/42 |
| 2008/0030631 A1 * | 2/2008 | Gallagher | ...................... | 348/818 |
| 2009/0186181 A1 * | 7/2009 | Mase | ............................ | 428/40.1 |
| 2010/0200456 A1 * | 8/2010 | Parkinson | ..................... | 206/701 |
| 2011/0285932 A1 * | 11/2011 | Park | ................................. | 349/56 |

\* cited by examiner

*Primary Examiner* — Lisa Lea Edmonds
(74) *Attorney, Agent, or Firm* — Kenneth L Tolar

(57) ABSTRACT

A screen protector applicator includes a cradle having a bottom surface, a plurality of upstanding peripheral walls and an open top in communication with an interior chamber. The interior chamber is dimensioned and configured to tightly conform to the periphery of both an adhesive screen protector and a corresponding portable electronic device, such as a wireless phone. The protector includes an earpiece slit adjacent a top edge and a control button aperture proximal a lower edge that respectively align with a protrusion and a mound on the bottom surface of the cradle. To apply the screen protector, a user positions the protector within the cradle such that the protrusion is seated in the slit and the mound is received within the aperture. A protective layer on the film is removed to expose an adhesive, and the electronic device is superimposed, face-down, on the anchored film to adhesively bond the device thereto.

12 Claims, 3 Drawing Sheets

SCREEN PROTECTOR APPLICATOR

CROSS REFERENCE TO RELATED APPLICATIONS

This application is entitled to the benefit of provisional application No. 61/357,777 filed on Jun. 23, 2010, the specification of which is incorporated herein by reference.

BACKGROUND OF THE INVENTION

The present invention relates to a tool for easily applying screen protectors to portable electronic devices.

DESCRIPTION OF THE PRIOR ART

Personal data assistants (PDA's), iPods®, iPhones®, Blackberries® and similar portable electronic devices often have touch-screens for conveniently accessing certain applications. However, the screens are susceptible to scratches, smudges and spills, which can render the screen inoperable and significantly mar its appearance. As a result, many people apply a screen protector, which is a transparent, adhesive film that is dimensioned and configured to perfectly overlay the screen or the entire front face of the electronic device. However, because an entire side of the film is coated with the adhesive, it can inadvertently adhere to an undesirable location, resulting in misalignment. Furthermore, because the adhesive is tenuous, a single misapplication may require the film to be removed and discarded, which is burdensome and costly.

A review of the prior art reveals no tools for applying screen protectors or any other devices that are purported to address the above-described problems. For example, U.S. Pat. No. 7,070,837 issued to Ross discloses a screen protector having a roughened surface that minimizes contact with the screen to prevent Newton-ring interference patterns.

U.S. Pat. No. 7,133,707 issued to Rak et al. discloses a mobile device cover plate having a push-through dial keypad.

U.S. Pat. No. 7,428,427 issued to Brunstrom et al. discloses a cover for a portable electronic device.

U.S. Pat. No. 6,750,922 issued to Benning discloses a protector for video display screens that is secured with adhesive tabs and latches.

As indicated above, none of the above-described references disclose a tool for applying a screen protector. The present invention provides a tool having a specially-configured cavity that aligns a screen protector and an associated electronic device so that they can be adhesively joined.

SUMMARY OF THE INVENTION

A screen protector applicator includes a cradle having a bottom surface, a plurality of upstanding peripheral walls and an open top in communication with an interior chamber. The interior chamber is dimensioned and configured to tightly conform to both an adhesive screen protector and a corresponding portable electronic device, such as a wireless phone. The protector includes an earpiece slit adjacent a top edge and a control button aperture proximal a lower edge that respectively receive a protrusion and a mound on the bottom surface of the cradle when the protector is properly positioned therein. A protective layer covering the adhesive is removed and the electronic device is superimposed, face-down, on the anchored protector to adhesively bond the device thereto.

It is therefore an object of the present invention to provide a tool that allows a user to quickly and easily apply a protective film to a portable electronic device.

It is another object of the present invention to provide a tool that maintains a protective film and an associated electronic device in proper alignment so that they can be adhesively joined.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
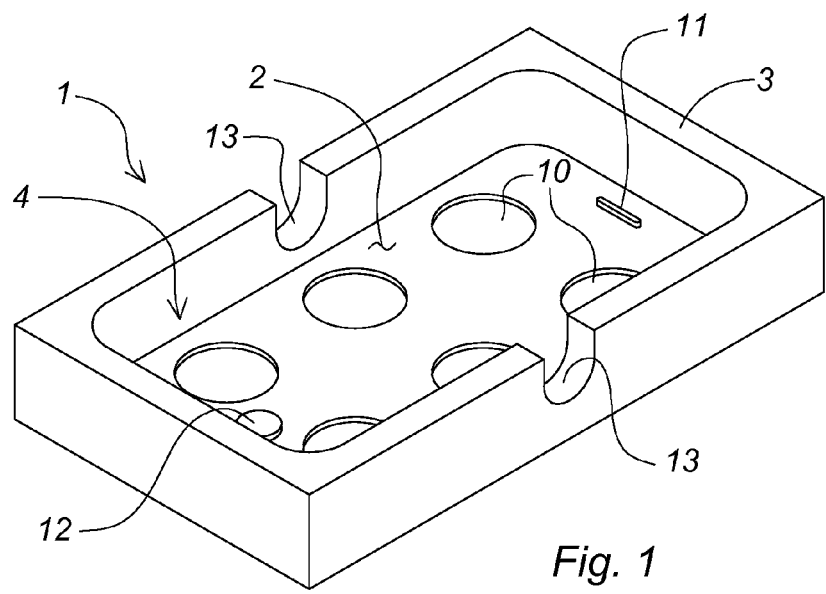
FIG. 1 is a perspective view of the applicator according to the present invention.
Figure 2:
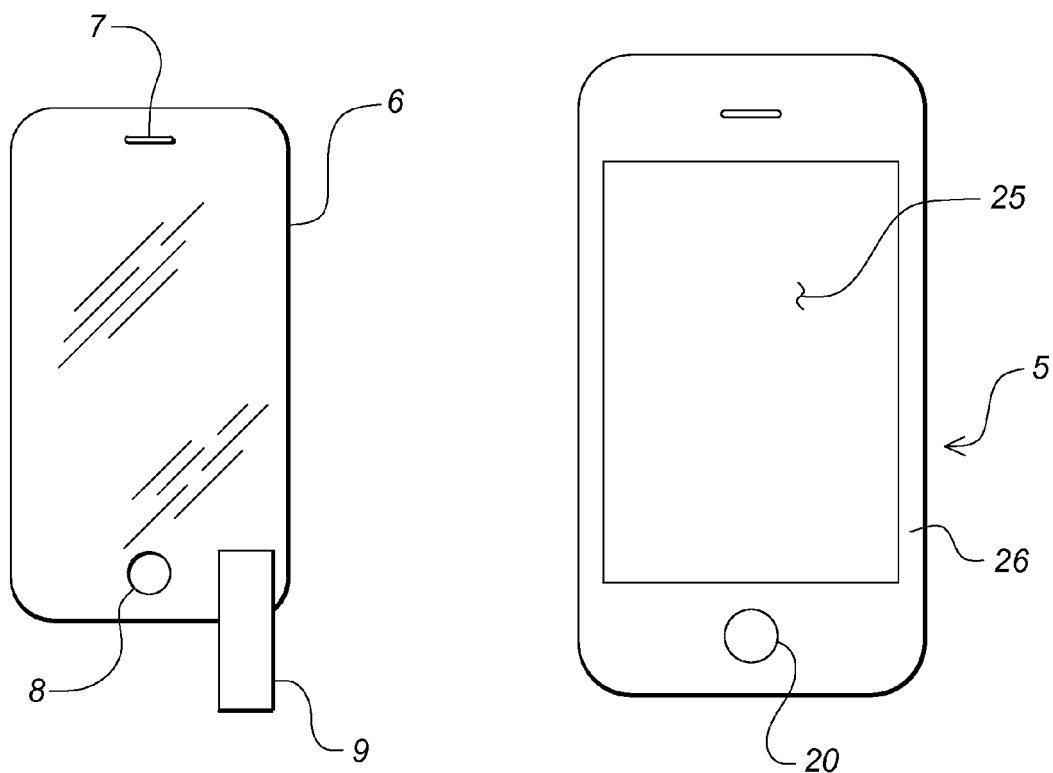
FIG. 2 depicts an exemplary protective film and associated electronic device for use with the applicator depicted in FIG. 1.
Figure 3:
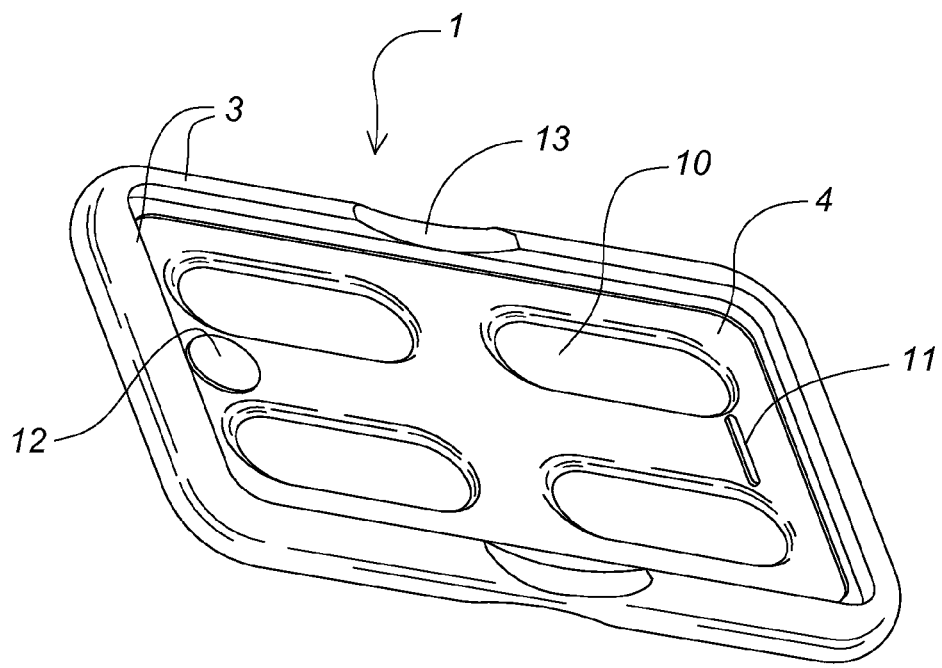
FIG. 3 is a top, perspective view of another embodiment of the present invention.
Figure 5:
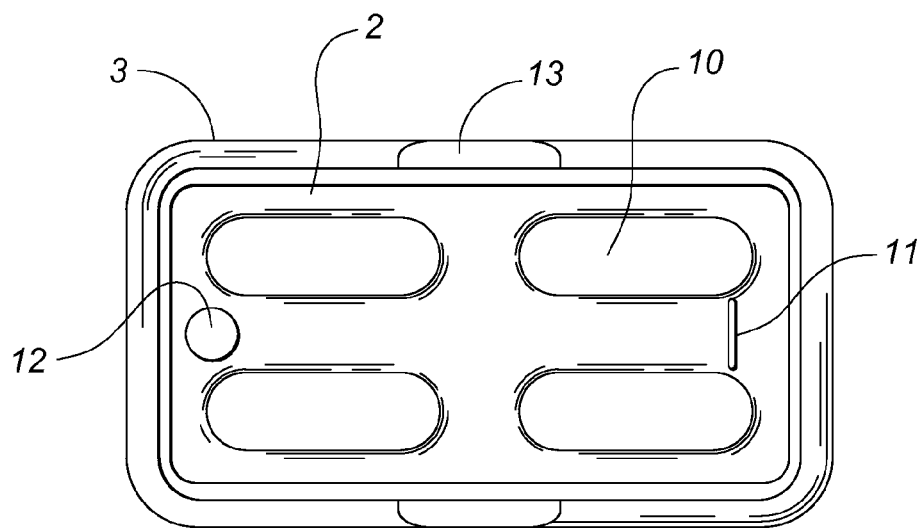
FIG. 5 is a top, plan view of the embodiment of FIG. 3.
Figure 4:
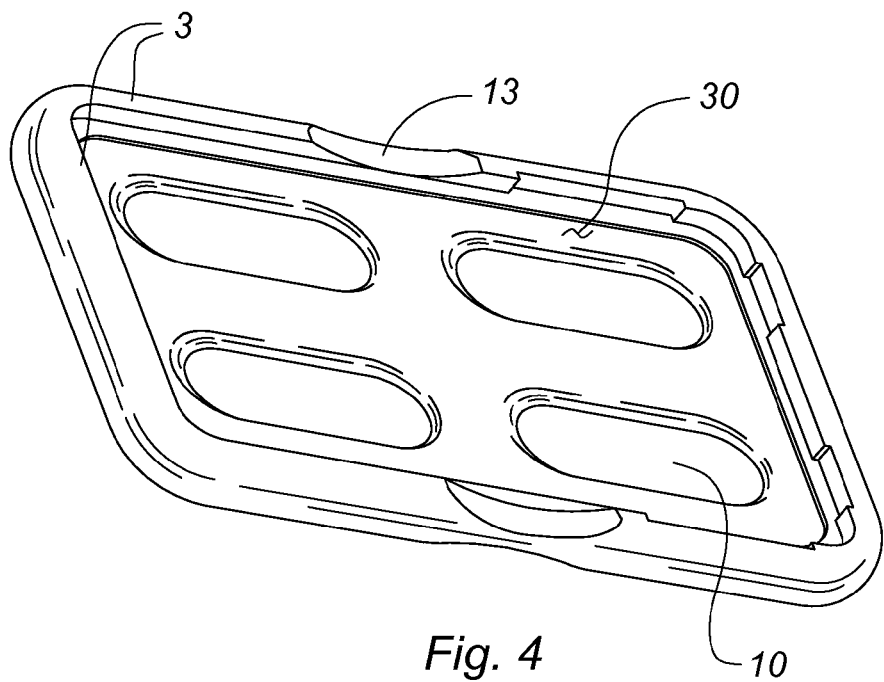
FIG. 4 is a bottom, perspective view of the embodiment of FIG. 3.
Figure 6:
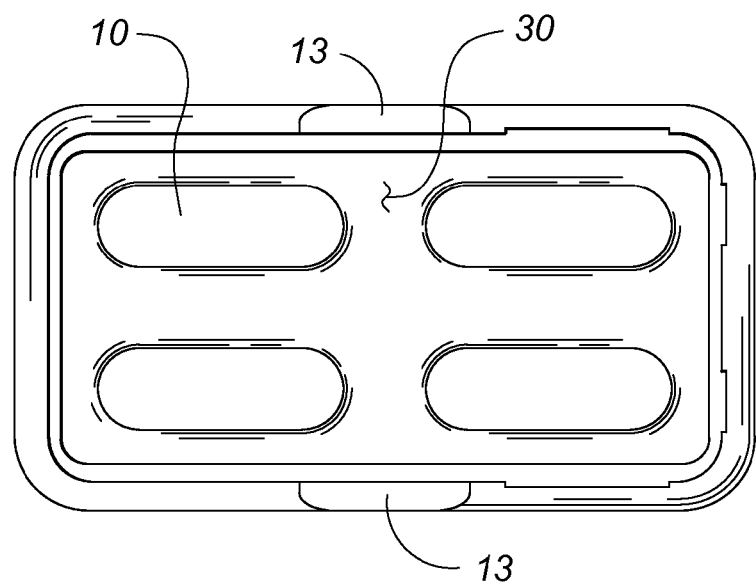
FIG. 6 is a bottom, plan view of the embodiment of FIG. 3.

The present invention relates to a screen protector applicator comprising a cradle 1 having a bottom surface 2, a plurality of upstanding peripheral walls 3 and an open top in communication with an interior chamber 4. The interior chamber is dimensioned and configured to tightly conform to the periphery of both a screen protector 6 and a corresponding portable electronic device, such as a wireless phone 5. For example, the device depicted in FIG. 1 is specifically designed for a wireless phone 5 of the type marketed and sold under the trademark iPhone®. Therefore, the cradle chamber is also dimensioned and configured to statically retain a screen protector 6 designed for the wireless phone marketed and sold under the trademark iPhone®. As depicted in FIG. 2, the screen protector 6 is formed of a transparent film having the substantially same shape, size and contour of the front face 26, or the screen 25, of the electronic device. The film includes an aperture 8 proximal a lower edge that is designed to expose a HOME button 20 found on the wireless phone of the type referenced above. The film further includes a slit 7 adjacent a top edge that aligns with an earpiece on the electronic device when the protector is properly installed. A protective layer (not pictured) superimposed on a lower surface of the film is removed with a tab 9 to expose an adhesive.

The cradle depicted in FIG. 1 is specifically designed for the protector and associated phone described above and includes a plurality of apertures 10 on the bottom surface for relieving air that may be trapped between the film and the cradle. Also positioned on the bottom surface, proximal and end thereof, is an elongated protrusion 11 that is positioned and dimensioned to tightly fit within the earpiece slit 7; at an opposing end of the bottom surface is a circular mound 12 that is dimensioned and configured to tightly seat within the HOME button aperture. Each of two opposing peripheral walls includes a finger indention 13 on an upper edge to assist a user with gasping the electronic device when removing it from the cradle.

Now referring specifically to FIGS. 3-6, a slightly different embodiment is depicted wherein the cradle also includes a secondary, oppositely-facing chamber 30 that is configured to conform to a different model or type of electronic device than the primary chamber 4. For example, the primary chamber 4 could be applicable to an iPhone® 3G while the secondary chamber 30 could be specifically designed for the phone commonly referred to as an iPhone® 4. The phone specifically marketed and sold under the trademark iPhone® 4 includes a camera on a rear surface that is sometimes protected by a unitary film having no openings or apertures. As such, the secondary chamber 30 includes neither a protrusion nor a mound, which would otherwise hinder proper placement of the unitary protector. Accordingly, the secondary chamber can be interchangeably used to apply a protector to either the front surface or the rear surface of an iPhone® 4.

To apply a screen protector, a user positions the film within the primary chamber such that the protrusion 11 is seated within the slit 7 and the mound is received within the aperture 8. The spacing and configuration of the upstanding peripheral walls, in combination with the protrusion and the mound, prevent the film from shifting. The protective layer is removed to expose the adhesive and the electronic device is superimposed, face-down, on the anchored film to adhesively secure the device thereto.

The above-described device is not limited to the exact details of construction and enumeration of parts provided herein. For example, though the device has been primarily depicted and described as being designed for an iPhone® brand wireless phone, it can be designed for applicators that are intended for virtually any type of portable electronic device without departing from the spirit of the present invention. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A screen protector applicator comprising:
    a cradle having a bottom surface and at least one upstanding peripheral wall that defines a primary chamber, said primary chamber dimensioned and configured to tightly conform to a screen protector and a corresponding portable electronic device;
    an elongated protrusion on the bottom surface of said cradle, said protrusion dimensioned and configured to tightly seat within an earpiece opening formed on said screen protector.

2. The screen protector according to claim 1 further comprising a plurality of apertures on the bottom surface of said cradle for relieving air trapped between the protector and the cradle.

3. The screen protector according to claim 1 further comprising a mound on the bottom surface of said cradle, said mound dimensioned and configured to tightly seat within a control button aperture formed on said protector.

4. The screen protector according to claim 1 wherein said peripheral wall includes at least one finger indention to assist a user with gasping the electronic device when received within said chamber.

5. The screen protector according to claim 1 further comprising a secondary chamber that is dimensioned and configured to tightly conform to a second type of screen protector and a second type of portable electronic device.

6. A screen protector applicator comprising:
    a cradle having a bottom surface and at least one upstanding peripheral wall that defines a primary chamber, said primary chamber dimensioned and configured to tightly conform to a screen protector and a corresponding portable electronic device;
    a secondary chamber that is dimensioned and configured to tightly conform to a second type of screen protector and a second type of portable electronic device.

7. The screen protector according to claim 6 further comprising a plurality of apertures on the bottom surface of said cradle for relieving air trapped between the protector and the cradle.

8. The screen protector according to claim 6 further comprising an elongated protrusion on the bottom surface of said cradle, said protrusion dimensioned and configured to tightly seat within an earpiece opening formed on said screen protector.

9. The screen protector according to claim 6 further comprising a mound on the bottom surface of said cradle, said mound dimensioned and configured to tightly seat within a control button aperture formed on said protector.

10. The screen protector according to claim 6 wherein said peripheral wall includes at least one finger indention to assist a user with gasping the electronic device when received within said chamber.

11. A method of applying a screen protector to a portable electronic device comprising the steps of:
    placing the screen protector within a cradle having a substantially similar shape, size and configuration as said protector and said portable electronic device;
    placing said portable electronic device within said cradle and superimposing said portable electronic device on said protector;
    fastening said protector to said electronic device;
    anchoring said protector within said cradle prior to placing said electronic device thereon;
    inserting a protrusion disposed within said cradle into an earpiece opening on said protector.

12. The method according to claim 11 further comprising the steps of inserting a mound disposed within said cradle into a control button aperture formed on said protector.

\* \* \* \* \*